(12) United States Patent
Sastry et al.

(10) Patent No.: US 11,362,835 B2
(45) Date of Patent: Jun. 14, 2022

(54) EFFICIENT POST-QUANTUM ANONYMOUS ATTESTATION WITH SIGNATURE-BASED JOIN PROTOCOL AND UNLIMITED SIGNATURES

(71) Applicant: Intel Corporation, Santa Clara, CA (US)

(72) Inventors: Manoj Sastry, Portland, OR (US); Rafael Misoczki, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 166 days.

(21) Appl. No.: 16/455,978

(22) Filed: Jun. 28, 2019

(65) Prior Publication Data

US 2019/0319801 A1     Oct. 17, 2019

(51) Int. Cl.
*H04L 9/32* (2006.01)
*H04L 9/06* (2006.01)
*H04L 9/08* (2006.01)

(52) U.S. Cl.
CPC .......... *H04L 9/3247* (2013.01); *H04L 9/0643* (2013.01); *H04L 9/0822* (2013.01); *H04L 9/0894* (2013.01); *H04L 9/3236* (2013.01); *H04L 9/0861* (2013.01)

(58) Field of Classification Search
CPC ... H04L 9/3247; H04L 9/0643; H04L 9/0822; H04L 9/0894; H04L 9/3236; H04L 9/0861
See application file for complete search history.

(56) References Cited

U.S. PATENT DOCUMENTS

2017/0230182 A1    8/2017   Misoczki et al.

FOREIGN PATENT DOCUMENTS

| CN | 112152794 A | 12/2020 |
| EP | 3756283 A1 | 12/2020 |

OTHER PUBLICATIONS

Communication—extended European search report for EP Application No. 20162087.9, dated Aug. 21, 2020, 11 pages.
(Continued)

*Primary Examiner* — Ayoub Alata
(74) *Attorney, Agent, or Firm* — Jaffery Watson Mendonsa & Hamilton LLP

(57) ABSTRACT

In one example an apparatus comprises a computer readable memory; and a signature module to generate a set of cryptographic keys for attestation of group member devices and a set of leaf nodes in a sub-tree of a Merkle tree corresponding to the set of cryptographic keys, forward the set of leaf nodes to a group manager device, receive, from the group manager device, a subset of intermediate nodes in the Merkle tree, the intermediate nodes being common to all available authentications paths through the Merkel tree for signatures originating in the sub-tree, and determine a cryptographic key that defines an authentication path through the Merkle tree, the authentication path comprising one or more nodes from the set of leaf nodes and one or more nodes from the intermediate nodes received from the group manager device. Other examples may be described.

21 Claims, 18 Drawing Sheets

(56) References Cited

OTHER PUBLICATIONS

Bansarkhani Rachid, et al.: "G-Merkle: A Hash-Based Group Signature Scheme from Standard Assumptions", Apr. 1, 2018 (Apr. 1, 2018), Annual International Conference on the Theory and Applications of Cryptographic Techniques, Eurocrypt 2018; [Lecture Notes in Computer Science; Lect. Notes Computer], Springer, Berlin, Heidelberg, pp. 441-463, XP047471365, ISBN: 978-3-642-17318-9.
Dan Boneh, et al.: "Post-Quantum EPID Group Signatures from Symmetric Primitives", IACR, International Association for Cryptologic Research vol. 20180411:055624 Apr. 11, 2018 (Apr. 11, 2018), pp. 1-30, XP061027120.
Ando Megumi et al.: "Hash-Based TPM Signatures for the Quantum World", Jun. 9, 2016 (Sep. 16, 2016, Annual International Conference on the Theory and Applications of Cryptographic Techniques, Eurocrypt 2018; [Lecture Notes in Computer Science; Lect.Notes Computer], Springer, Berlin, Heidelberg, pp. 77-94, XP047346887, ISBN: 978-3-642-17318-9.

One-Time Hash-Based Signatures

A private key must only sign a single message

Multi-Time Hash-Based Signatures

A private key can sign a multiple messages

WOTS One-Time Signature Scheme

Message is hashed and parsed into M:67 integers between [0,1,2,...15]

- 205: Public Key pk: 67 components of 32-bytes each
- 210: Signature s: 67 components of 32-bytes each
- 215: Public Key pk: 67 components of 32-bytes each

EFFICIENT POST-QUANTUM ANONYMOUS ATTESTATION WITH SIGNATURE-BASED JOIN PROTOCOL AND UNLIMITED SIGNATURES

BACKGROUND

Subject matter described herein relates generally to the field of computer security and more particularly to attestation schemes for post-quantum cryptography using secure hash-based signing and verification.

Anonymous remote attestation mechanisms allow a hardware and/or software platform to attest its authenticity to external verifying entities (e.g., an Original Equipment Manufacturer (OEM)) without revealing the identity of the platform to the verifying entity. For example, Enhanced Privacy ID (EPID) is based on cryptographic schemes for which their security relies on the hardness of Elliptic Curve and Pairing-based cryptography computational problems. However, it is well known in the cryptography community that both Elliptic Curve and Pairing-based cryptography will be broken by quantum computers.

Accordingly, techniques to implement post-quantum anonymous attestation using signature and verification schemes such as XMSS and LMS may find utility, e.g., in computer-based communication systems and methods.

BRIEF DESCRIPTION OF THE DRAWINGS

The detailed description is described with reference to the accompanying figures.

DETAILED DESCRIPTION

Described herein are exemplary systems and methods to implement attestation schemes for post-quantum cryptography using secure hash-based signing and verification. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance (e.g., hash-based signature schemes).

Figure 1A:
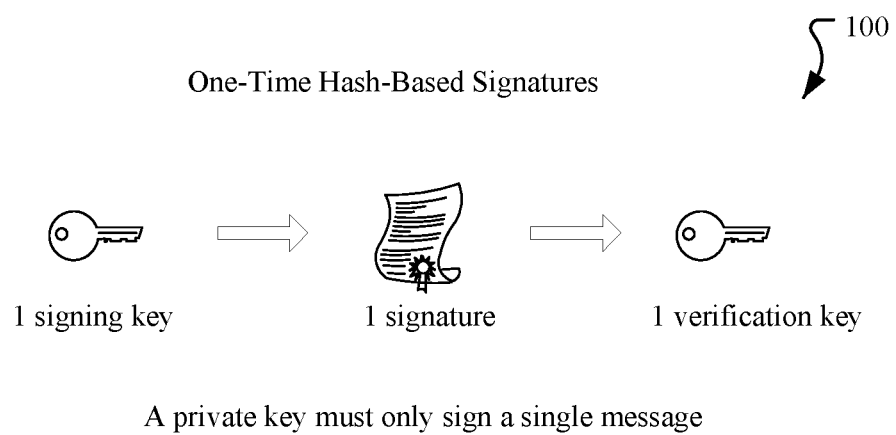
FIGS. 1A and 1B are schematic illustrations of a one-time hash-based signatures scheme and a multi-time hash-based signatures scheme, respectively.
Figure 1B:
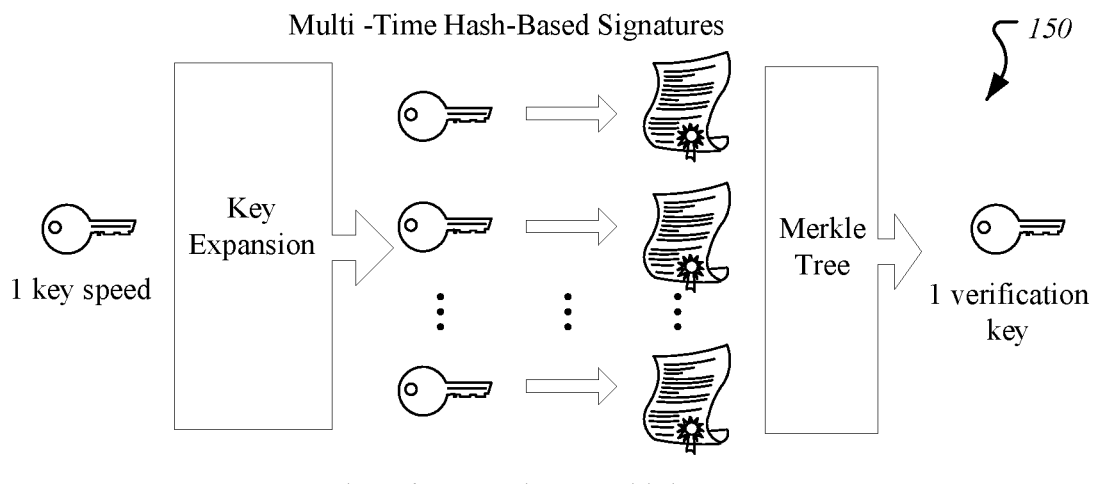

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
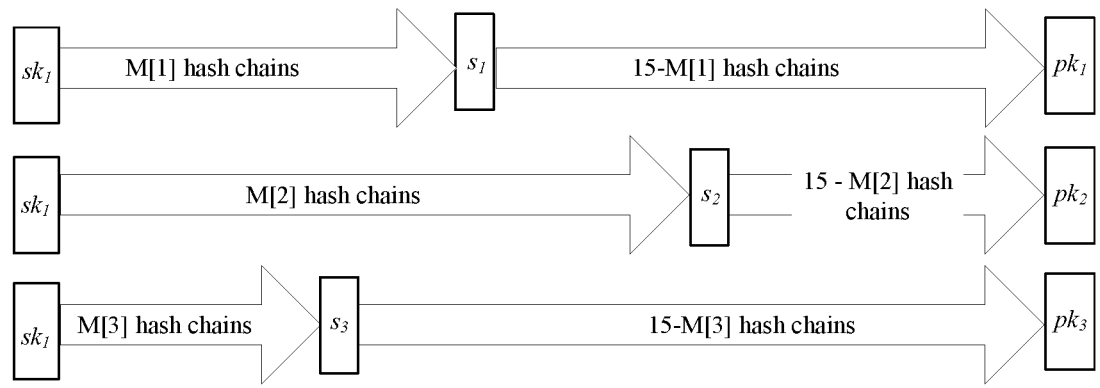
FIGS. 2A-2B are schematic illustrations of a one-time signature scheme and a multi-time signature scheme, respectively.
Figure 2A:
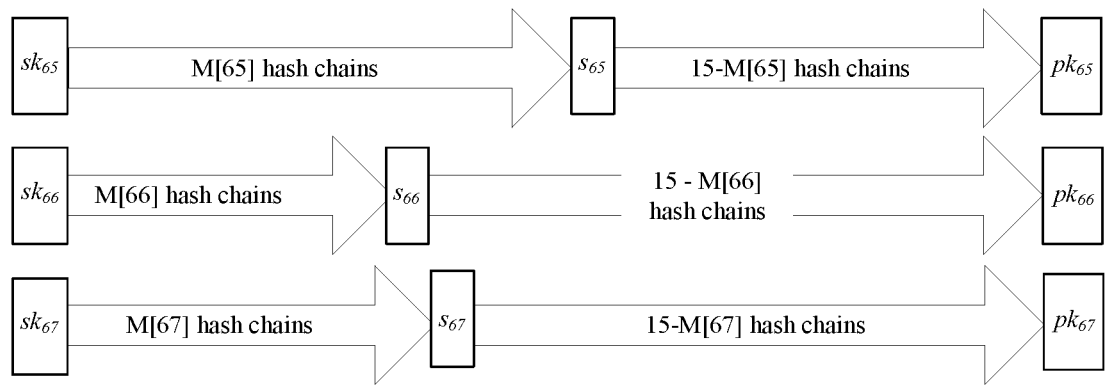
Figure 2B:
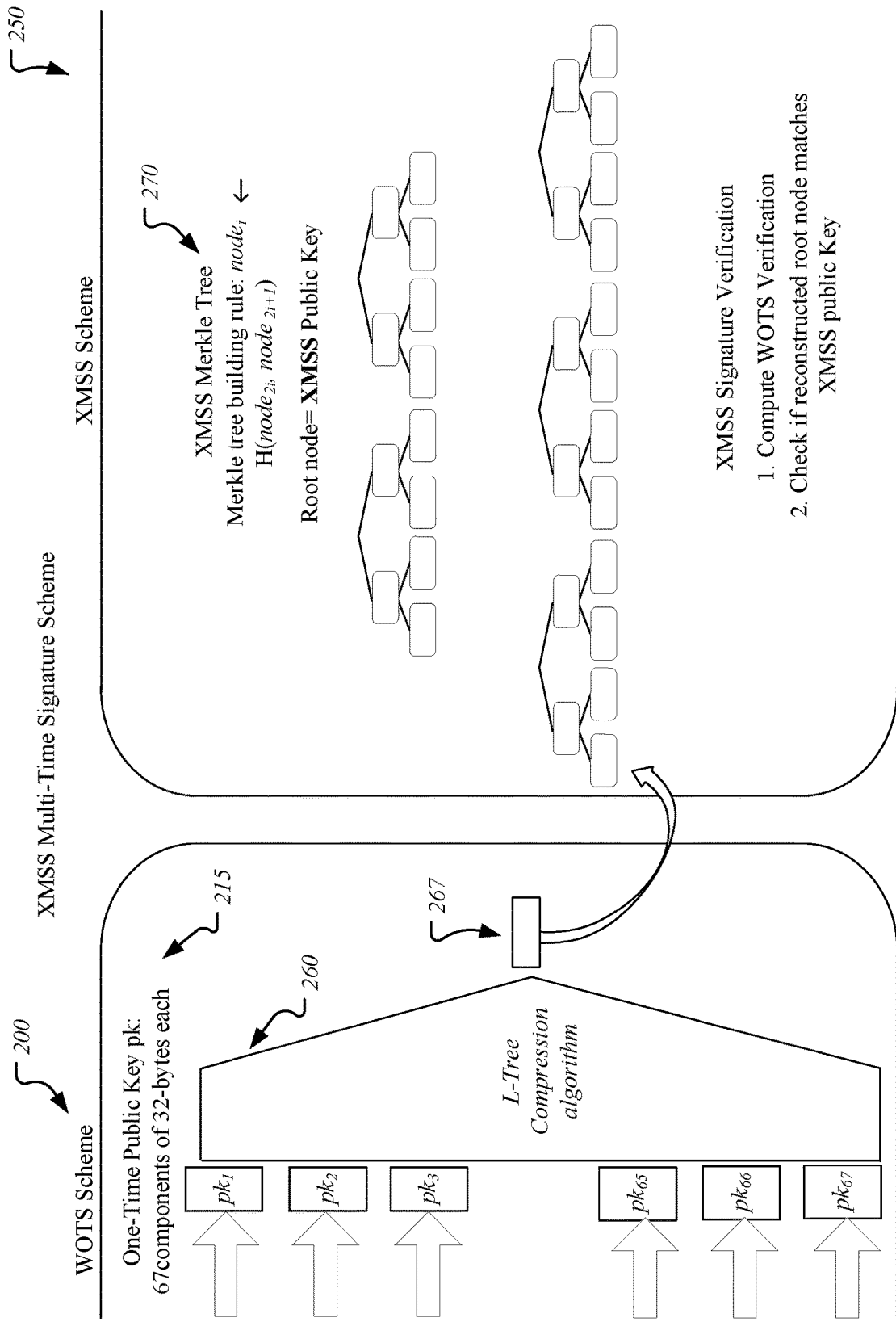

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)|h(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Devices and Processes for Post-Quantum Cryptography

Figure 3:
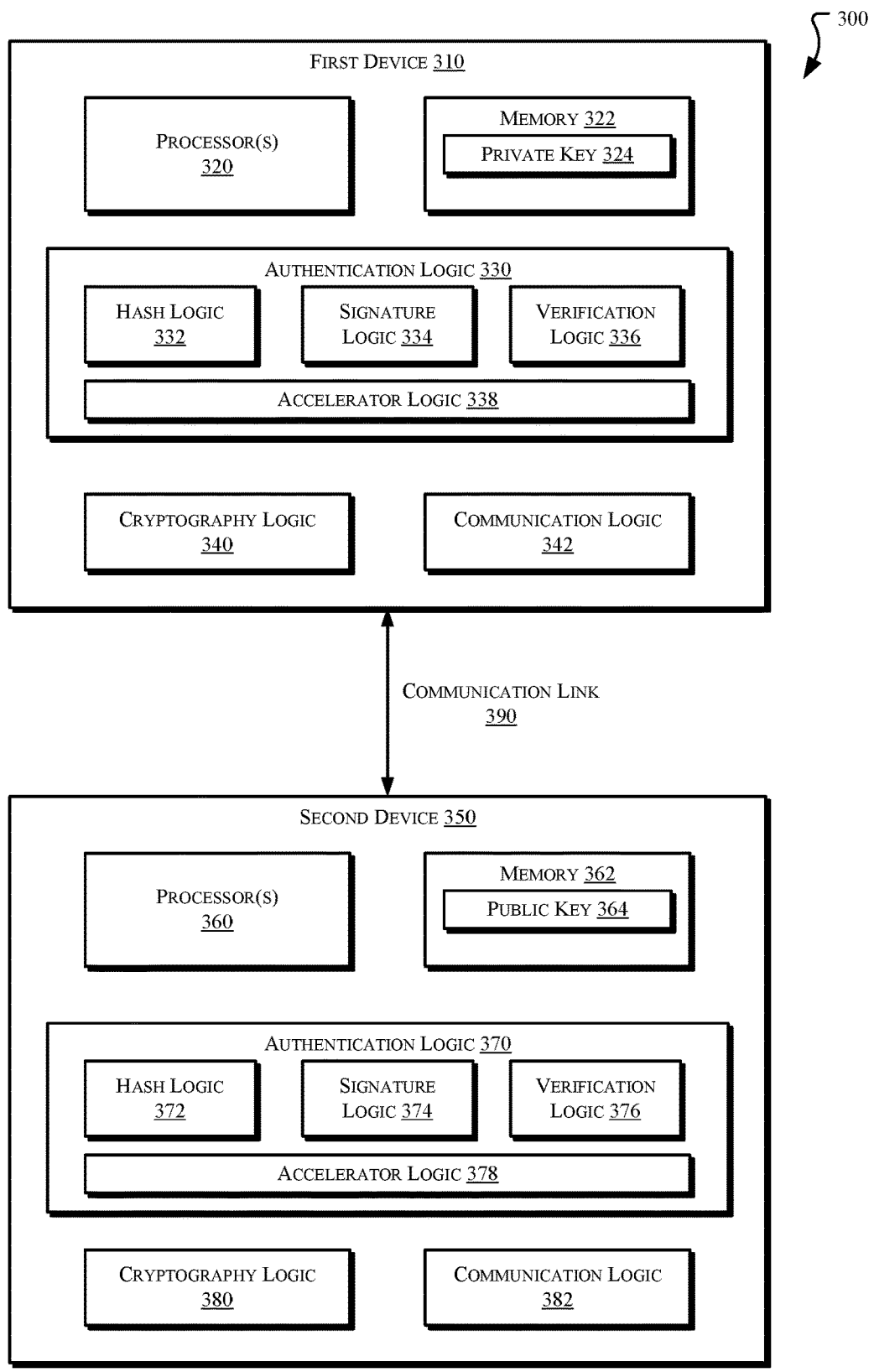
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes memory 332, signature logic, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature and/or to verify a signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $s_{ki}$ of the private key, $s_k$, a respective number of times related to a value of each message element, $m_i$ included in the message representative m'. For example, signature logic 332 may be configured to apply a selected hash function to a corresponding private key element, $s_{ki}$, $m_i$ times. In another example, signature logic 332 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., "XMSS: Extended Hash-Based Signatures, released May, 2018, by the Internet Research Task Force (IRTF), Crypto Forum Research Group which may be found at https://tools.ietf.org/html/rfc8391.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or N-$m_i$ times to generate a signature and to apply the hash function to each received message element N-$m_{i'}$ or $m_{i'}$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to verifier device 350 in a previous exchange. The public key, $p_k$, is configured to contain a number L of public key elements, i.e., $p_k=[p_{k1}, \ldots, p_{kL}]$. The public key 364 may be stored, for example, to memory 362.

Second device 350 further comprises authentication logic 370 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, N–$m_{i'}$ (or $m_{i'}$), times to yield a verification message element. Whether a verification signature, i.e., each of the L verification message elements, corresponds to a corresponding public key element, $p_{ki}$, may then be determined. For example, verification logic 370 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

In some examples the authentication logic 330 of the first device 310 includes one or more accelerators 338 that cooperate with the hash logic 332, signature logic 334 and/or verification logic 336 to accelerate authentication operations. Similarly, in some examples the authentication logic 370 of the second device 310 includes one or more accelerators 378 that cooperate with the hash logic 372, signature logic 374 and/or verification logic 376 to accelerate authentication operations.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
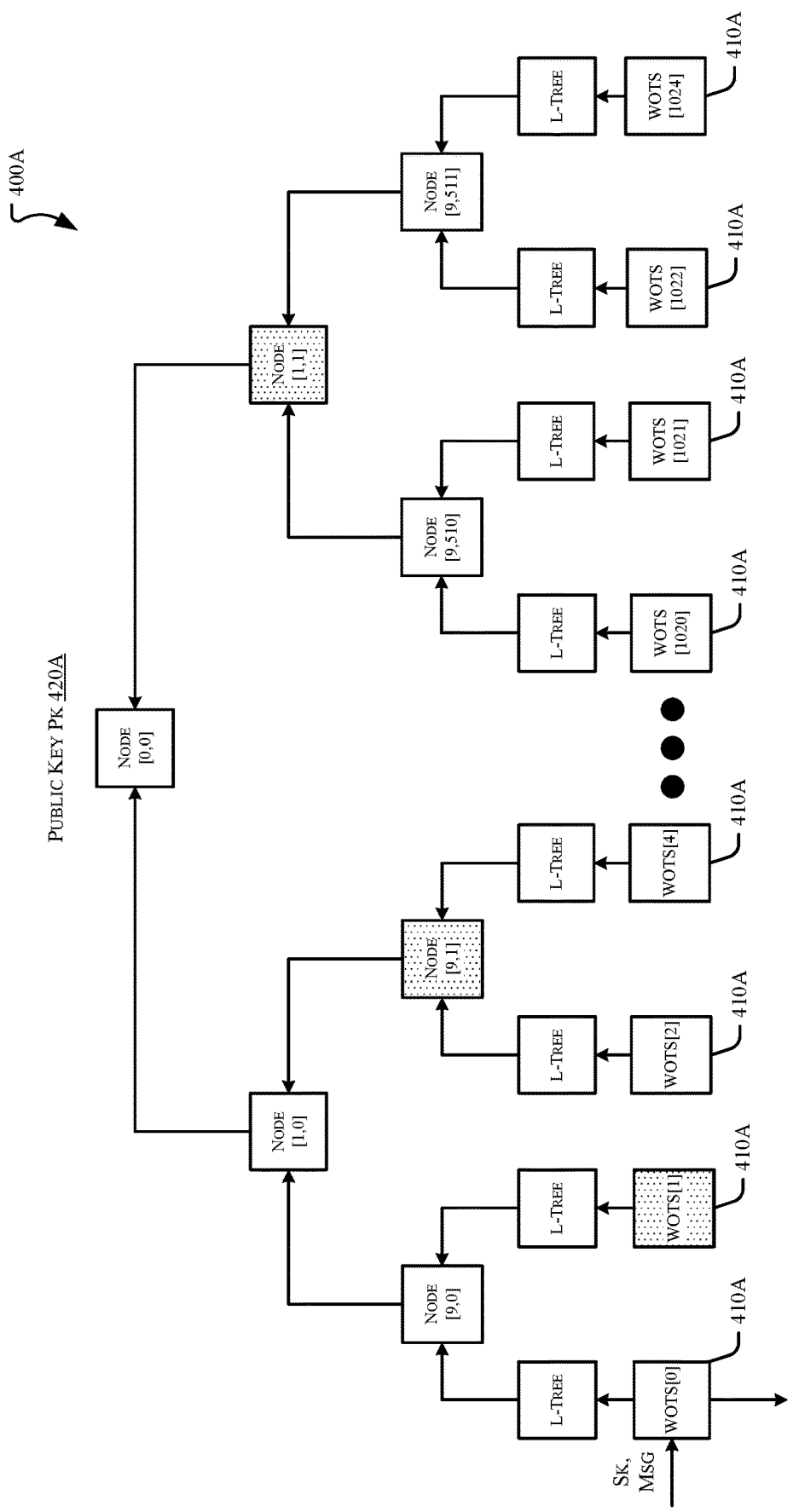
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
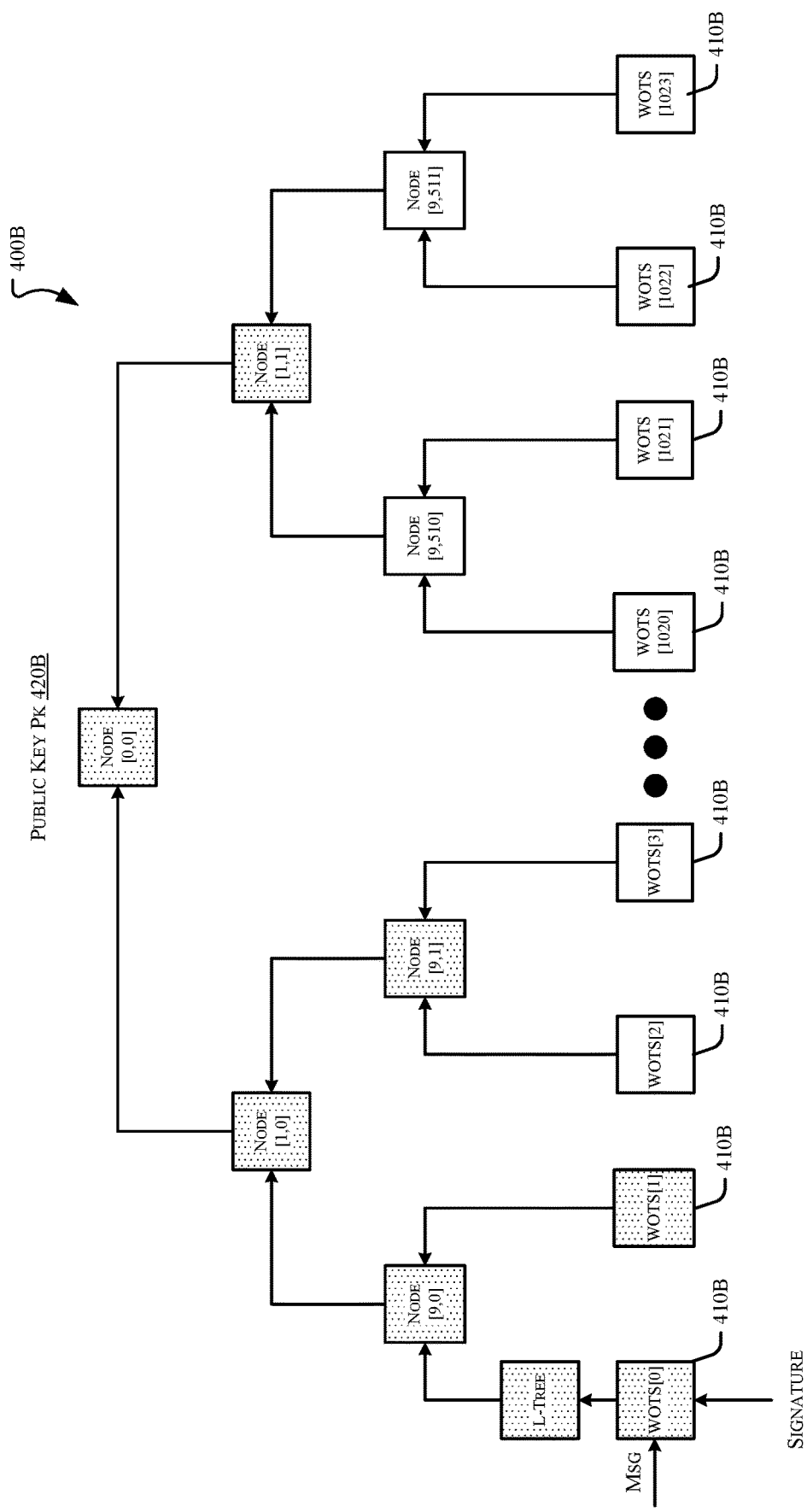
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute a significant portion of XMSS sign/verify latency respectively, thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
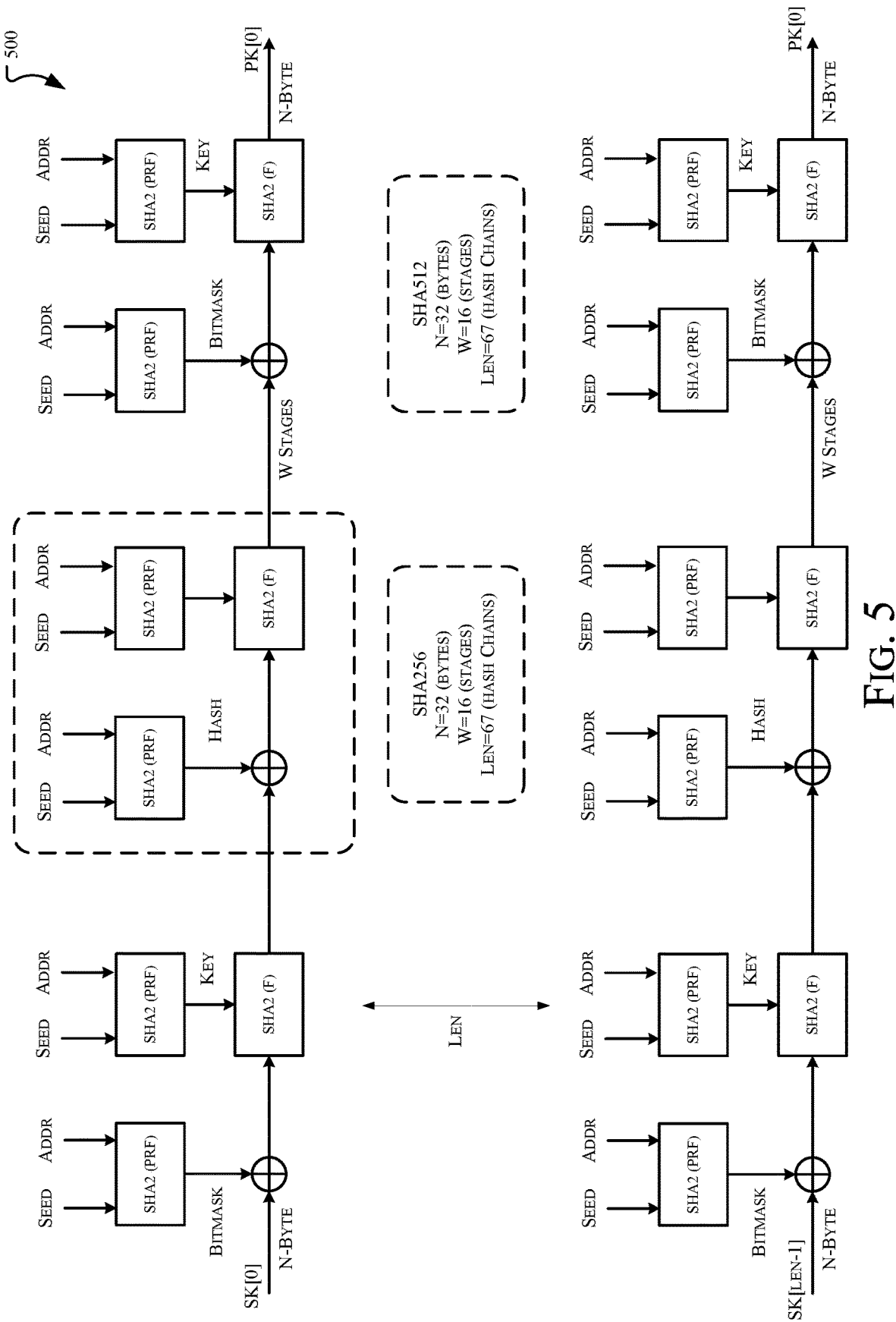
FIG. 5 is a schematic illustration of a compute blocks in an architecture to implement a signature algorithm, in accordance with some examples.

FIG. 5 is a schematic illustration of compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
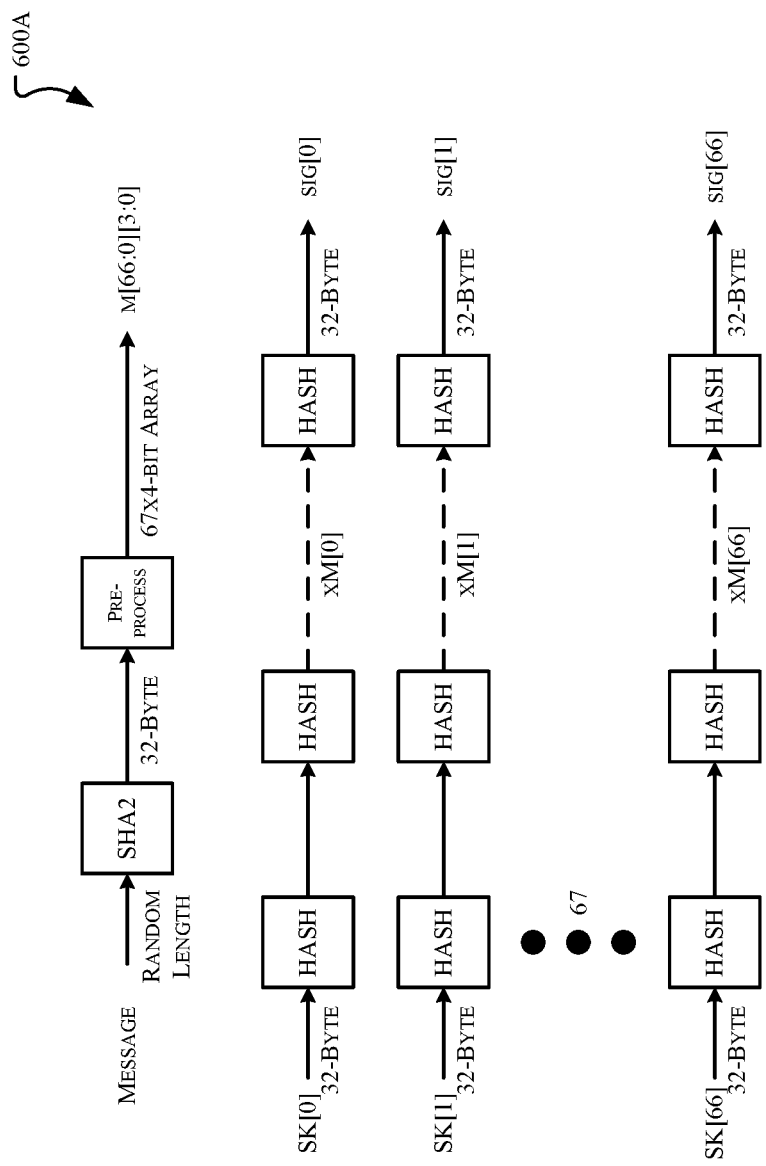
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each chain.

Figure 6B:
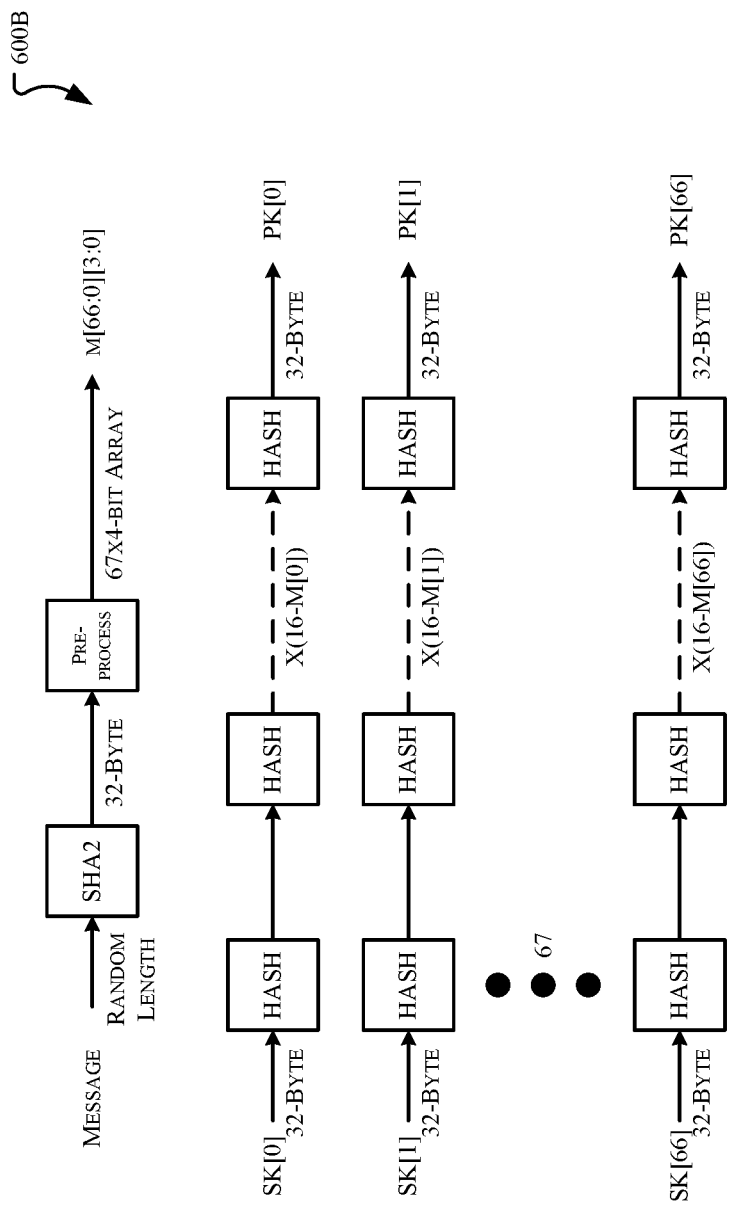
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

Post-Quantum Anonymous Attestation

Some existing post-quantum attestation techniques use hash-based signatures, which provide strong security guarantees, in order to achieve resistance against quantum attacks and to achieve anonymity with respect to group members and verifiers, unlinkability of signatures (i.e., given two signatures, it is not possible to determine whether they come from a same signer), and private-key based revocation. However existing hash-based techniques do not offer features including signature-based revocation, a flexible number of signatures, a join protocol (i.e., existing techniques have fixed number of members set in key generation time; the group cannot be extended to more members after key generation), and does not allow the group member generate all information required for signatures (e.g., the signature authentication path). Described herein is a quantum-resistant group signature scheme that addresses these shortcomings.

Figure 7:
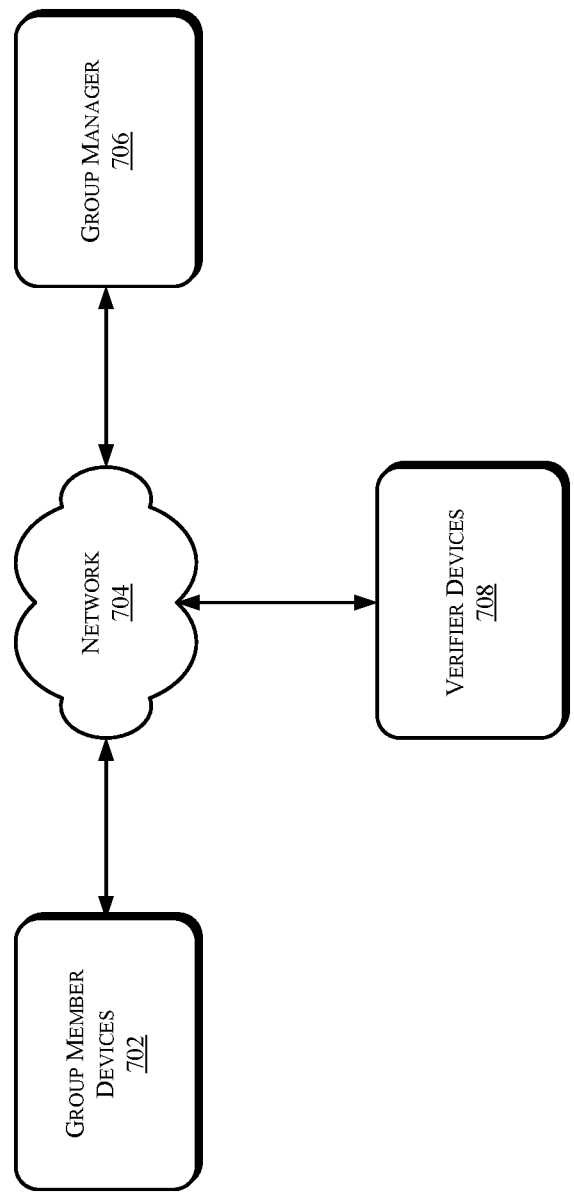
FIG. 7 is a schematic illustration of a system to implement post-quantum anonymous attestation using a signature-based join protocol, in accordance with some examples.

Referring now to FIG. 7, a system 700 for remote attestation is shown. In particular, it should be appreciated that the illustrative system 700 permits quantum-resistant hash-based anonymous remote attestation. As described in detail below, in the illustrative embodiment, the system 700 implements a privacy-preserving mechanism based on hash-based digital signatures. In particular, in some embodiments, the system 700 utilizes Merkle signatures, of modified versions thereof, to achieve a group signature scheme and a "mixing" technique using a strong cryptographic mixer (e.g., a block cipher with the group manager holding the secret cryptographic key) in order to achieve signature unlinkability and anonymity (with traceability for the group manager 706). By doing so, it should be appreciated that the system 700 may be resistant to quantum-based attacks (e.g., unlike Elliptic Curves and pairing-based cryptography) and/or may be quasi-optimal with respect to many relevant metrics (e.g., all or almost all relevant metrics). In some embodiments, the scheme is built upon Merkle hash-based signatures and only a hash function and block cipher are required as fundamental building blocks of the scheme, which may enable unlinkability between any two signatures issued by the same signatory/signer. Further, in some embodiments, the system 700 involves an attestation scheme that is quasi-optimal in the signature size increasing only with the number of group members (e.g., Log N*(Hash_Output_Size)+signature size). The scheme may require only hash computations and block cipher operations (i.e., for key generation) that allow for operation speeds similar to conventional single-signer Merkle constructions.

Depending on the particular embodiment, the attestation scheme of the system 700 may employ various security, privacy, and/or revocation features. For example, the attestation scheme implements unforgeability such that a valid signature can only be produced by group members holding a private key (i.e., non-group members cannot produce a valid signature). Further, the scheme may employ anonymity such that it is impossible to identify the issuer of a given signature out of a group and any group member can be the signer of a document and/or may employ unlinkability such that it is computationally infeasible to determine if two or more signatures were issued by the same source (i.e., all group members may produce identically distributed signatures, leaking no information about the corresponding originators). In some embodiments, the scheme may utilize a verifier-linked mode in which the signer allows the verifier to be able to link two signatures oriented from the same signer. Unlike other schemes that result in untraceability, in some embodiments, the illustrative attestation scheme allows the group manager 706 to utilize trace features (e.g., to identify the originator of a signature). In some embodiments, the attestation scheme may provide for private key based revocation such that an arbitrary verifier of signature is permitted to identify all signatures issued by a signer with a revoked secret key. Further, in some embodiments involving signature-based revocation, a signer must convince the verifier that it is not the issuer of a revoked signature.

It should be appreciated that a traditional Merkle signature scheme construction turns a one-time signature (OTS) scheme, such as Winternitz OTS scheme, into a multi-time signature scheme. An OTS scheme includes a private key, sk, used to sign and a public key, pk, used to verify the signature and are limited in that a single private key is only used to sign one message since multiple uses of the same private key may compromise the security of the scheme. As such, Merkle schemes utilize a tree to authenticate an exponential number of OTS public keys, which binds an exponentially high number of OTS public keys to a single multi-time public key, PK. In the illustrative embodiment, the number of key is exponential in the height of the tree but still relatively small as such keys/signatures must be computed. Further, a signature generated with the set of OTS private keys may be validated with a single public key (i.e., the Merkle public key, PK).

As shown in FIG. 7, the system 100 includes a plurality of group member devices 702, a network 704, and a group manager 706. Additionally, in some embodiments, the system 700 may include one or more verifier devices 708. Although only one network 704 is illustratively shown in FIG. 7, the system 700 may include any number of networks 704 in other embodiments. For example, in some embodiments, a group member device 702 and the group manager 106 may communicate with one another over a first network 704, and the group member device 702 may communicate with a verifier device 706 (e.g., another group member device 702) over another network 704.

As described below, each of the group member devices 702 belongs to a group associated with the group manager 706. In the illustrative embodiment, each of the group member devices 702 generates at least one cryptographic key pair including a public cryptographic key and a private cryptographic key and generates cryptographic hash of each public cryptographic key. The cryptographic hashes, public cryptographic keys, and/or other identifying information may be transmitted to the group manager 706, which may reassign such data to the group member devices 702 (e.g., via a randomized permutation) as described in further detail below. By doing so, a Merkle scheme may be utilized for a group signature while preventing the verifier device 706 from identifying the group member device 702 that issued a particular signature. The group manager 706 may store various data associated with the cryptographic signature scheme, which may, for example, enable to group manager 706 to trace such signatures and perform key revocation and/or other administrative functions related to the group.

In some embodiments, the group member devices 702 may communicate with one another such that one group member device 702 signs a message for verification by another group member device 702. In such embodiments, the verifying group member device 702 may act as a verifier device 708. However, it should be appreciated that, in other embodiments, one of the group member devices 702 may attest to (and generated a signature for verification by) a verifier device 708 other than a group member device 702.

Figure 8:
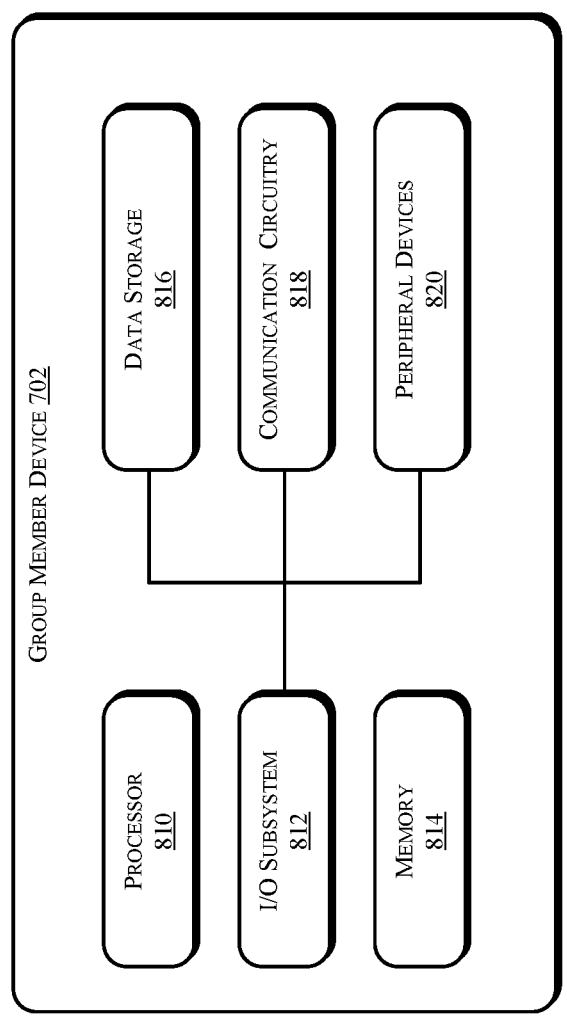
FIG. 8 is a schematic illustration of a group member device which may be used to implement post-quantum anonymous attestation using a signature-based join protocol in accordance with some examples.

Referring now to FIG. 8, each of the group member devices 702 may be embodied as any type of computing device capable of performing the functions described herein. For example, in some embodiments, each of the group member devices 702 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device. As shown in FIG. 8 each of the illustrative group member devices 702 includes a processor 810, an input/output ("I/O") subsystem 812, a memory 814, a data storage 816, a communication circuitry 818, and one or more peripheral devices 820. Of course, the group member devices 702 may include other or additional components, such as those commonly found in a typical computing device (e.g., various input/output devices, peripheral devices, and/or other components), in other embodiments. Additionally, in some embodiments, one or more of the illustrative components may be incorporated in, or otherwise form a portion of, another component. For example, the memory 814, or portions thereof, may be incorporated in the processor 810 in some embodiments.

The processor 810 may be embodied as any type of processor capable of performing the functions described herein. For example, the processor 810 may be embodied as a single or multi-core processor(s), digital signal processor, microcontroller, or other processor or processing/controlling circuit. Similarly, the memory 814 may be embodied as any type of volatile or non-volatile memory or data storage capable of performing the functions described herein. In operation, the memory 814 may store various data and software used during operation of the corresponding group member device 702 such as operating systems, applications, programs, libraries, and drivers. The memory 814 is communicatively coupled to the processor 810 via the I/O subsystem 812, which may be embodied as circuitry and/or components to facilitate input/output operations with the processor 810, the memory 814, and other components of the group member device 702. For example, the I/O subsystem 812 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 812 may form a portion of a system-on-a-chip (SoC) and be incorporated, along with the processor 810, the memory 814, and other components of the group member device 702, on a single integrated circuit chip.

The data storage 816 may be embodied as any type of device or devices configured for short-term or long-term storage of data such as, for example, memory devices and circuits, memory cards, hard disk drives, solid-state drives, or other data storage devices. The data storage 816 and/or the memory 814 may store various data during operation of the group member device 702 as described herein.

The communication circuitry 818 may be embodied as any communication circuit, device, or collection thereof, capable of enabling communications between the group member device 702 and other remote devices over a network (e.g., the network 104). The communication circuitry 818 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 820 may include any number of additional peripheral or interface devices, such as speakers, microphones, additional storage devices, and so forth. The particular devices included in the peripheral devices 820 may depend on, for example, the type and/or intended use of the group member device 702.

Referring back to FIG. 7, the network 704 may be embodied as any type of communication network capable of facilitating communication between the group member devices 702 and remote devices (e.g., the group manager 706 and/or the verifier devices 708). As such, the network 704 may include one or more networks, routers, switches, computers, and/or other intervening devices. For example, each network 704 may be embodied as or otherwise include one or more cellular networks, telephone networks, local or wide area networks, publicly available global networks (e.g., the Internet), an ad hoc network, or any combination thereof.

Each of the group manager 706 and/or the verifier devices 708 may be embodied as any type of computing device capable of performing the functions described herein. For example, in some embodiments, group manager 706 and/or the verifier device 708 may be embodied as a desktop computer, workstation, server, laptop computer, tablet computer, notebook, netbook, Ultrabook™, cellular phone, smartphone, personal digital assistant, mobile Internet device, wearable computing device, Hybrid device, and/or any other computing/communication device. Further, the group manager 706 and/or the verifier device 708 may include components similar to those of the group member device 702 discussed above. The description of those components of the group member device 702 is equally applicable to the description of components of the group manager 706 and/or the verifier device 708 and is not repeated herein for clarity of the description. Further, it should be appreciated that the group manager 706 and/or the verifier device 708 may include other components, sub-components, and devices commonly found in a computing device, which are not discussed above in reference to the group member device 702 and not discussed herein for clarity of the description. In some embodiments, one or more of the components of the group member device 702 may be omitted from the group manager 706 and/or the verifier device 708.

Figure 9:
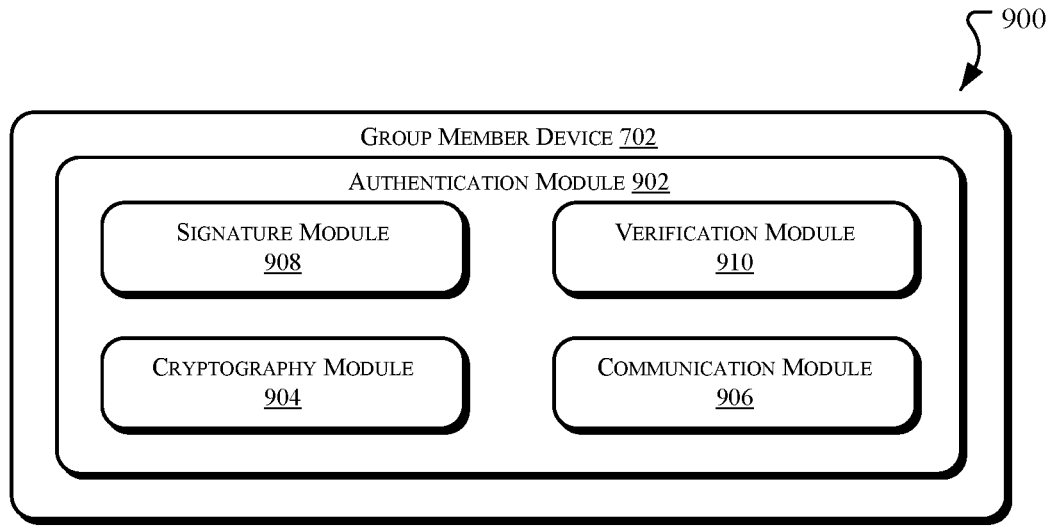
FIG. 9 is a schematic illustration of an environment of the group member device of FIG. 8, in accordance with some examples.

Referring now to FIG. 9, in use, the group member device 702 establishes an environment 900 for remote attestation. The illustrative environment 900 includes an authentication module 902, a cryptography module 904, and a communication module 906. Additionally, the illustrative authentication module 902 includes a signature module 908 and a verification module 910. The various modules of the environment 900 may be embodied as hardware, software, firmware, or a combination thereof. For example, the various modules, logic, and other components of the environment 900 may form a portion of, or otherwise be established by, the processor 810 or other hardware components of the group member device 702. As such, in some embodiments, one or more of the modules of the environment 900 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another. Further, in some embodiments, one or more of the modules of the environment 900 may be omitted from a particular group member device 702 (e.g., the verification module 910).

The authentication module 902 is configured to perform various signature, verification, and/or other authentication functions on behalf of the group member device 702. As indicated above, the illustrative authentication module 902 includes the signature module 908 and the verification module 910. The signature module 908 is configured to generate cryptographic signatures of various messages on behalf of the group member device 702 (e.g., in conjunction with the cryptography module 904) based on the techniques described herein. For example, as described below, the signature module 908 may generate a signature of a message using a private cryptographic key assigned to the group member device 702 by the group manager 706 and determine an authentication path in a modified Merkle tree for transmittal to the verifier device 708. As described below, the verifier device 708 may utilize a corresponding public cryptographic key of the group member device 702 and the authentication path to generate a group public key and verify the validity of the signature.

The verification module 910 is configured to verify the validity of a signature included with a signed message transmitted from another group member device 702. As indicated above, depending on the particular embodiment, the verifier device 708 may be a group member device 702 or another compute device not belonging to the group (e.g., the group associated with the group manager 706). As described below, the verification module 910 may receive a signature of a message generated by a group member device 702 and an authentication path that identifies the cryptographic hashes necessary to compute/rebuild the group public key of the group and verify the signature based on a public cryptographic key of the group member device 702 corresponding with the private cryptographic key used to sign the message. Further, the verification module 910 may utilize, for example, a Merkle tree scheme to compute/rebuild the group public key based on the public cryptographic key of the group member device 702 and the authentication path and compare that computed group public key to the actual group public key (e.g., stored on the group member device 702 and/or retrieved from the group manager 706 or another compute device). In the illustrative embodiment, if the keys match, the signature is considered to be valid. Of course, in other embodiments, the system 700 may utilize additional security, privacy, and/or integrity measures. It should be appreciated that, depending on the particular embodiment, a particular group member device 702 or verifier device 708 may only be capable of signing (and therefore include the signature module 908), may only be capable of verifying (and therefore include the verification module 910), or be capable of both signing and verifying (and therefore include both the signature module 908 and the verification module 910).

The cryptography module 904 is configured to perform various cryptographic and/or security functions on behalf of the group member device 702. In some embodiments, the cryptography module 904 may be embodied as a cryptographic engine, an independent security co-processor of the group member device 702, a cryptographic accelerator incorporated into the processor 810, or a standalone software/firmware. Depending on the particular embodiment, the cryptography module 904 may generate and/or utilize various cryptographic keys (e.g., symmetric/asymmetric cryptographic keys) for encryption, decryption, signing, and/or signature verification. Additionally, in some embodiments, the cryptography module 904 may establish a secure connection with remote devices over a network. It should further be appreciated that, in some embodiments, the cryptography module 904 and/or another module of the group member device 702 may establish a trusted execution environment or secure enclave within which a portion of the data described herein may be stored and/or a number of the functions described herein may be performed.

The communication module 906 is configured to handle the communication between the group member device 702 and other computing devices of the system 700. It should be appreciated that the communication module 906 may utilize any suitable algorithm or protocol for such communication.

Figure 10:
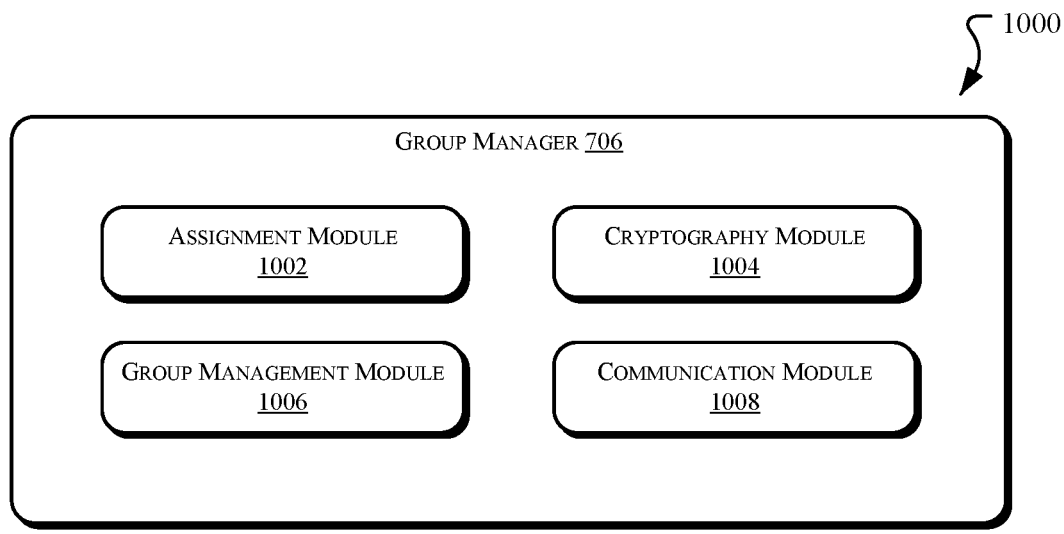
FIG. 10 is a schematic illustration of at least one embodiment of an environment of a group manager of the system of FIG. 7, in accordance with some examples.

Referring now to FIG. 10, in use, the group manager 706 establishes an environment 1000 for remote attestation. The illustrative environment 1000 includes an assignment module 1002, a cryptography module 1004, a group management module 1006, and a communication module 1008. The various modules of the environment 1000 may be embodied as hardware, software, firmware, or a combination thereof. For example, the various modules, logic, and other components of the environment 1000 may form a portion of, or otherwise be established by, the processor or other hardware components of the group manager 706. As such, in some embodiments, one or more of the modules of the environment 1000 may be embodied as circuitry or collection of electrical devices (e.g., an assignment circuitry, a cryptography circuitry, a group management circuitry, and/or a communication circuitry). Additionally, in some embodiments, one or more of the illustrative modules may form a portion of another module and/or one or more of the illustrative modules may be independent of one another.

The assignment module 1002 is configured to handle the reassignment of the cryptographic hashes and/or corresponding cryptographic keys generated by the group member devices 702. For example, in some embodiments, each of the group member devices 702 may generate one or more public-private cryptographic key pairs and a cryptographic hash of each of the corresponding public cryptographic keys (see, for example, the Merkle tree depicted in FIG. 9), which may be transmitted to the group manager 706. In such embodiments, the assignment module 1002 may reassign those keys/hashes as shown in FIG. 10, for example, to prevent the verifier device 706 from identifying the signer of a particular message. In some embodiments, the assignment module 1002 may reassign the keys/hashes based on a permutation (e.g., a random permutation) of the cryptographic hashes. For example, in some embodiments, the assignment module 1002 may apply a block cipher to the cryptographic hashes and/or utilize another suitable algorithm to randomly permute the cryptographic hashes.

Figure 11:
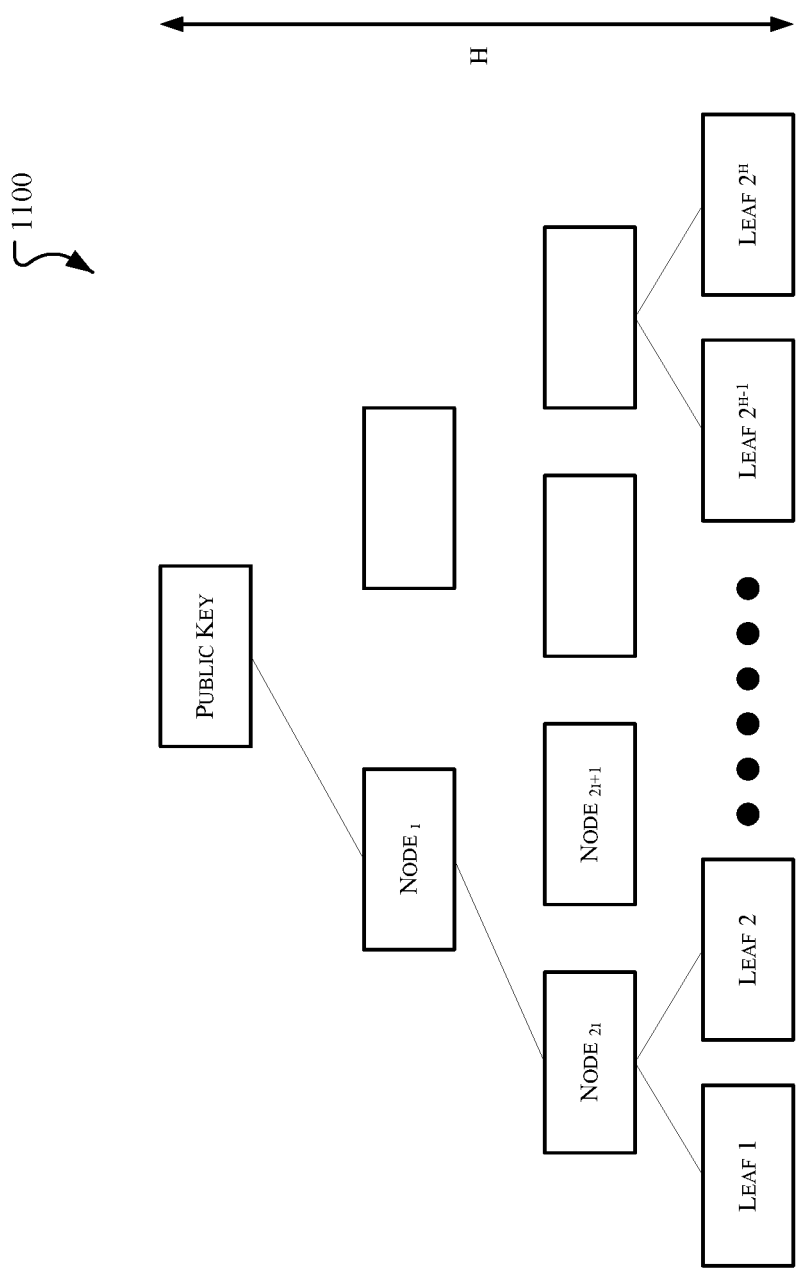
FIG. 11 is a schematic illustration of a Merkle Tree, in accordance with some examples.

FIG. 11 is a schematic illustration of a Merkle Tree 1100, in accordance with some examples. As described above, the Merkle signature scheme uses a data structure called "Merkle tree", which is a binary tree. FIG. 11 illustrates a Merkle tree of height h. Essentially, this binary tree combines $2^h$ leaf nodes into a single root node by using the rule: $node_i=H(node_{2i}\|nodes_{2i+1})$, where H stands for a hash function, $\|$ represents concatenation, and $node_i$ is the i-th node in the tree. In this notation, the nodes ($node_{2i}$, $node_{2i+1}$) are the children nodes of $node_i$. Each Leaf node is associated to one instance of a one-time signature scheme (for example, Winternitz-OTS or WOTS+).

In a conventional Merkle tree, each leaf node represents the ability of signing one, and only one, message. Therefore, a Merkle tree of $2^h$ nodes implies the ability of signing up to $2^h$ messages. Also, the root node of the Merkle tree 1100 is the public-key of the scheme. To verify a given signature, a user needs the public-key (root node) and other (h−1) nodes (i.e., the "authentication path" of a signature).

Figure 12:
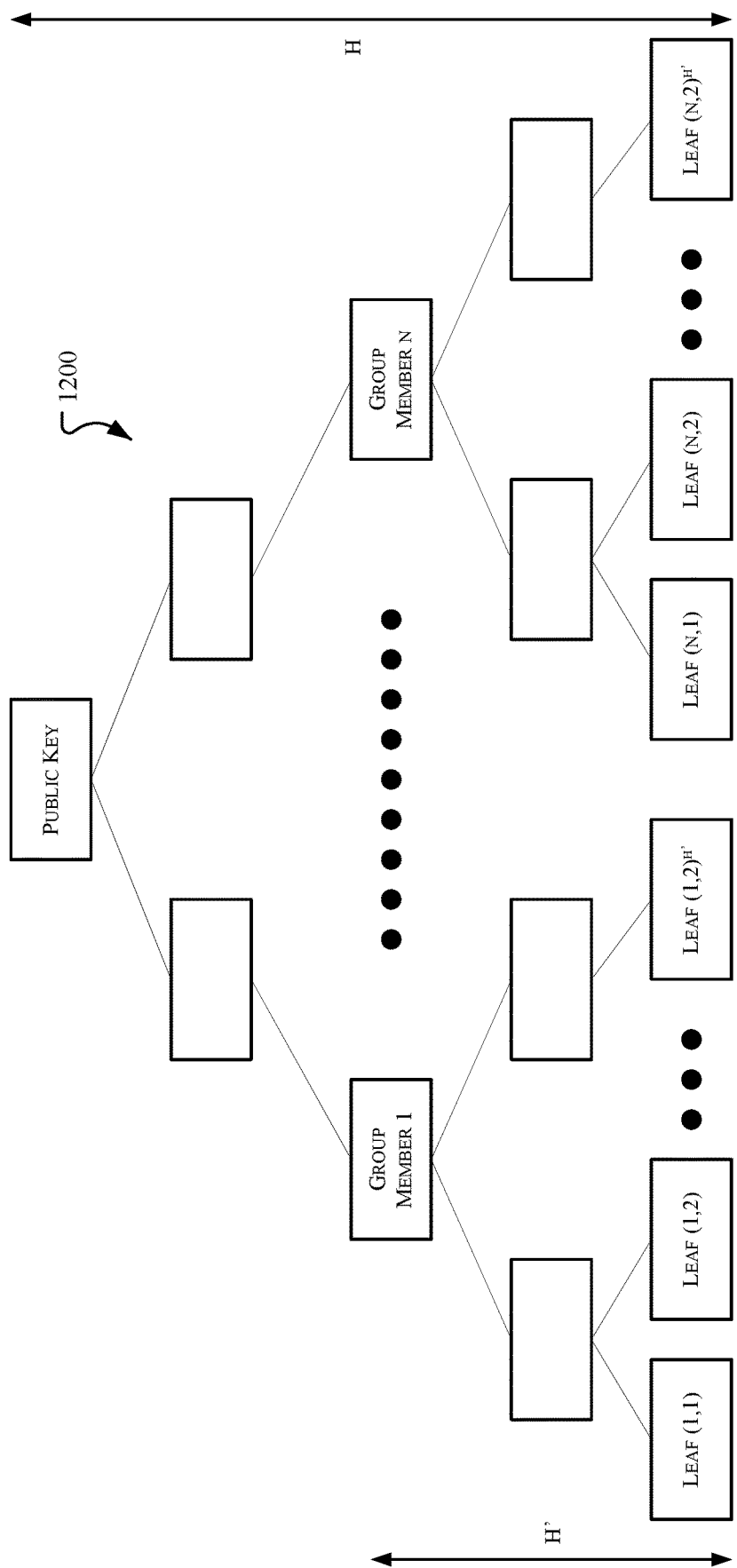
FIG. 12 is a schematic illustration of a Merkle Tree that may be used to implement post-quantum anonymous attestation using a signature-based join protocol, in accordance with some examples.

FIG. 12 is a schematic illustration of a Merkle Tree that may be used to implement post-quantum anonymous attestation using a signature-based join protocol, in accordance with some examples. Referring to FIG. 12, in some examples a Merkle tree may have some or all of its nodes distributed to the group members, such that the group members "own" one or more sub-trees of a Merkle tree 1200.

Subsequent leaf nodes are distributed to each group member. In this sense, a group member can be seen as the "owner" of some sub-tree of height h'<h, thus can sign $2^{h'}$ messages. The case h'=h refers to the single-signer user, i.e. a single group member (as seen in the traditional literature for hash-based signatures).

Having described structural components of electronic devices and data structures which may be used to implement post-quantum anonymous attestation using a signature-based join protocol, various operations in methods to implement post-quantum anonymous attestation using a signature-based join protocol will be described with reference to FIGS. 13-15. In some examples the various operations described with reference to FIGS. 13-15 may be implemented by one or more of the modules of the group member device 702 and/or one or more of the modules of the group manager 706, alone or in combination with other devices.

Figure 13:
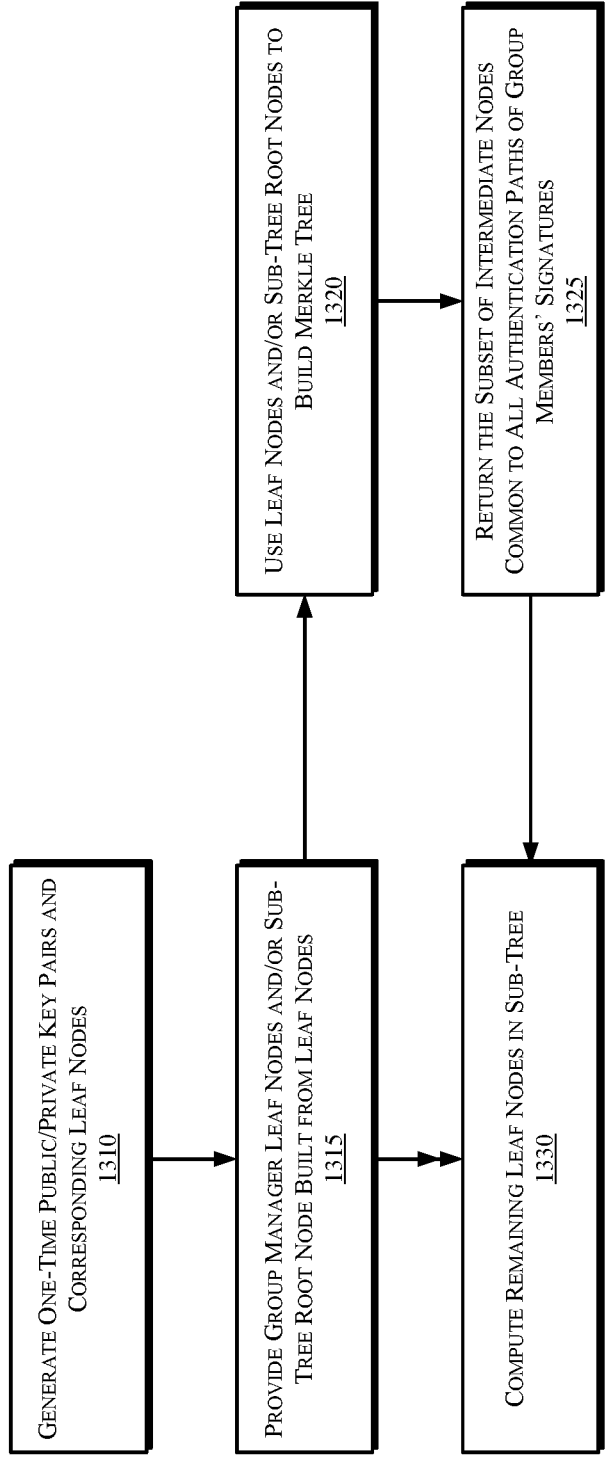
FIG. 13 is a flowchart illustrating operations in a method to implement post-quantum anonymous attestation using a signature-based join protocol, in accordance with some examples.

The flowchart of FIG. 13 illustrates operations in a method for key generation, in accordance with some examples. Referring to FIG. 13, at operation 1310, each group member device $G_i$, for 0<i<=h/h', in the group of group member devices 702 utilizing Merkle tree 1200 generates $2^{h'}$ one-time private-public key pairs and its corresponding $Leaf_{(i,j)}$ nodes, for 0<j<=$2^{h'}$. In some examples, the group member device(s) 702 may generate the cryptographic keys based on a random seed value. For example, in some embodiments, in order to generate the cryptographic keys, each group member device 702, $S_i$, samples a random seed, $k_i$, serving as the secret key. From $k_i$, the group member device 702 may generate a set/sequence of secret keys $sk_i^j=PRNG^j(k_i)$, using a secure pseudorandom number generator, where j runs from 1 to the number of signatures expected to be issued. It should be appreciated that the number of signatures issued per group member device 702 may vary depending on the particular embodiment as described above. In some embodiments, the number of signatures may be as large as $2^z$ for each signer. The group member devices 702 may compute the corresponding public keys $pk_i^j$ from $sk_i^j$ fusing a suitable cryptographic algorithm, as described above. Of course, it should be appreciated that the group member device 702 may otherwise generate the public/private cryptographic key pair(s) and/or other cryptographic keys using another suitable cryptographic algorithm.

In some examples, the group member devices 702 may generate cryptographic hashes of the generated cryptographic keys using a suitable cryptographic hashing algorithms (e.g., a Secure Hash Algorithm or message-digest algorithm, as described above). For example, the group member devices 702 may generates cryptographic hashes of the public cryptographic key(s) generated by the corresponding group member device 102. In some examples, the cryptographic hashes of the public keys serve as the leaf nodes of the Merkle tree 1200 and at operation 1315 each group member 702 provides to the group manager 706 its sets of 2h' leaf nodes. Alternatively, each group member device 702 can provide only the sub-tree root node built from the leaf nodes.

At operation 1320 the group manager 706 uses the sets of leafs or the sub-tree root nodes received from the group member device(s) 702 to build a Merkle tree according to a multi-signature authentication scheme. In some examples the group manager 706 mixes, permutes, or randomizes the positions of the leaf nodes using, for example, a block cipher outputting $\log_2(N2^z)$ bits, where $N=2^b$ denotes the number of group member devices 702. Of course, the group manager 706 may use any other suitable technique, algorithm, or mechanism to mix the positions of the leaf nodes in other embodiments. Based on the mixed set of leaf nodes, the group manager 706 may build a new Merkle tree 1200 for the group.

At operation 1325 the group manager 706 returns to each group member 702 the subset of (h–h') intermediate nodes common to all authentication paths of the respective group member device's signatures. The remaining h' nodes in the sub-tree are computed by the respective group members 702 (operation 1330), as they come from the sub-tree.

Figure 14:
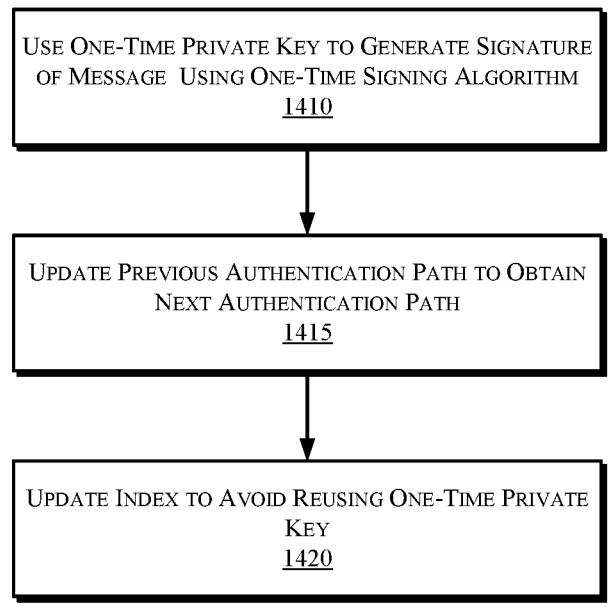
FIG. 14 is a flowchart illustrating operations in a method to implement post-quantum anonymous attestation using a signature-based join protocol, in accordance with some examples.

The flowchart of FIG. 14 illustrates operations in a method for signature and authentication path computation, in accordance with some examples. Referring to FIG. 14, at operation 1410 the group member device(s) 702 use the one-time private key $sk_k$, to generate the signature $\sigma_k$ of the message m using a one-time signing algorithm (e.g., WOTS or WOTS+) and $sk_k$. The authentication path $authpath_k$ is available either from key-generation or previous signing. The signature is composed by the pair (e.g., $\sigma_k$, $authpath_k$).

At operation 1415 the group member device(s) 702 obtain the next authentication path (i.e., to be used in signature k+1) by updating previous authentication path using techniques such as a forward secure signature scheme. As described above, the leaf nodes of the Merkle tree 1200 are related to one time signature (OTS) public cryptographic keys, pk, and intermediate nodes are constructed from the hash of the two children nodes (e.g., $node_i = H(node_{2i} \| node_{2i+1})$), and the root of the tree, PK, is a multi-use group public key. It should be appreciated that the authentication path identifies the cryptographic hashes of the sister leaf node and any intermediary nodes necessary to compute/rebuild the group public key. At operation 1420 the index k is updated to avoid re-using the same one-time private key: k←k+1.

Given the pair ($\sigma_k$, $authpath_k$) and the group public-key PK (Merkle root node), a verifier device 708 may proceed using a traditional Merkle scheme verification procedure. It accepts whether the verification process generates a root node which matches PK. In the event a private key is revoked, the group manager device 706 can readily identify further signatures by the revoked key, as the group manager device 706 securely publishes this key. In this way, any verifier device 708 would be able to check whether a signature was generated using such private-key or not. When a signature ($\sigma_k$, $authpath_k$) issued by a group member device 702 is revoked, any future signature ($\sigma_{k+1}$, $authpath_{k+1}$) issued by the group member device 702 can be rejected as the first (h-h') nodes of $authpath_{k+1}$ will necessarily matches the first (h-h') nodes of $authpath_k$. In some examples the group manager device 706 can securely publish a list of the first (h-h') nodes of $authpath_k$, and a verifier device 708 can compare those nodes to the ones in the new signature.

In some examples leaf nodes may be used to sign appended sub-trees, instead of messages to address the apparent limitation of having a fixed number of signatures per member. The leaf nodes of those sub-trees may be used to sign the messages. This strategy can be used indefinitely to enable unlimited number of signatures.

Figure 15:
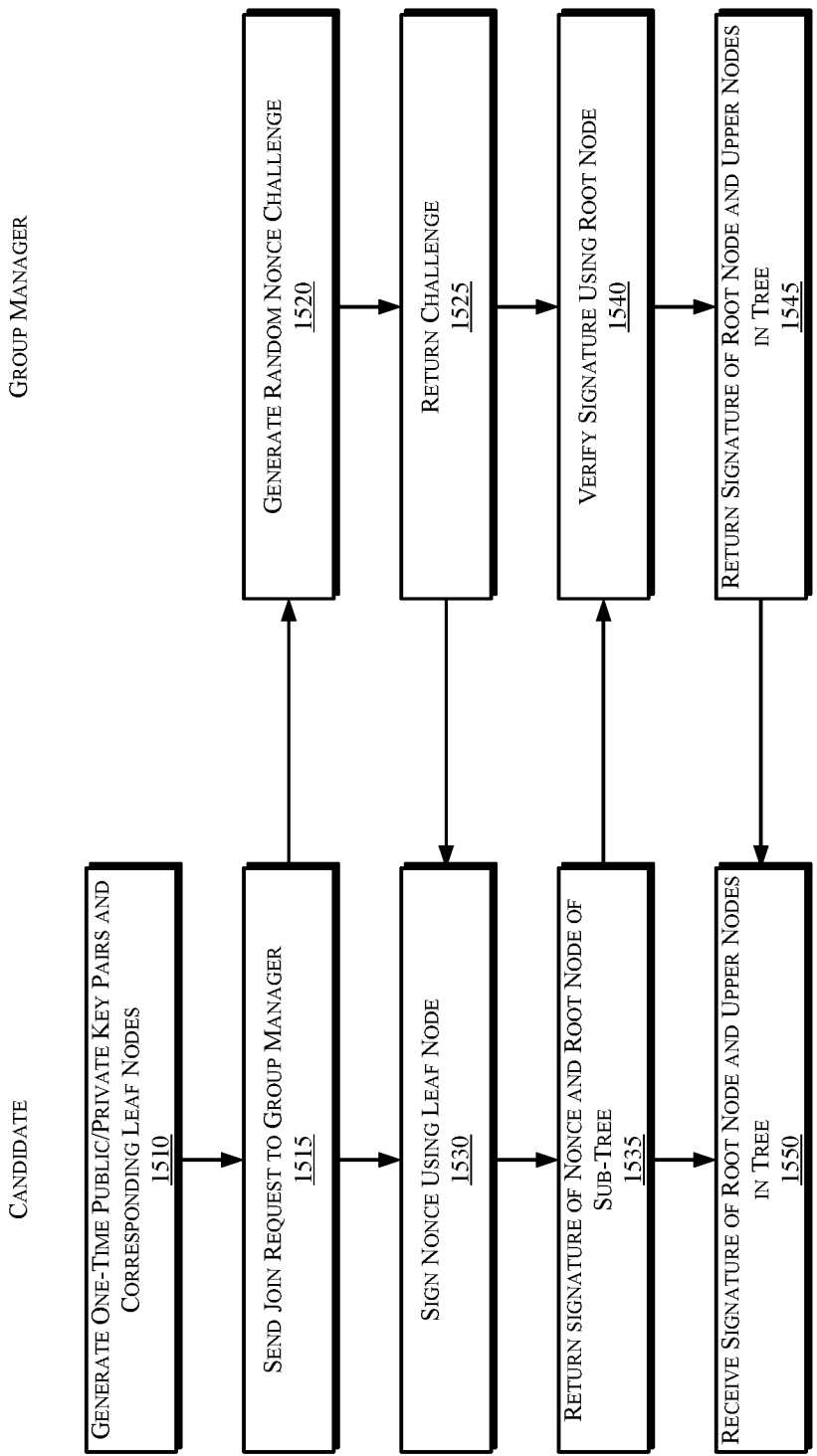
FIG. 15 is a flowchart illustrating operations in a method to implement post-quantum anonymous attestation using a signature-based join protocol, in accordance with some examples.

The flowchart of FIG. 15 illustrates operations in a method for a candidate device to join a group, in accordance with some examples. In some examples at least one of the sub-trees of the Merkle tree 1200 is owned by the group manager device 706. Referring to FIG. 15, at operation 1510 a candidate device that is attempting to become a group member generates $2^{h'}$ one-time key pairs, the $2^{h'}$ corresponding leaf nodes and the sub-tree root node, and at operation 1515 the candidate sends a join request message to the group manager 706.

At operation 1520 the group manager 706 generates a random nonce challenge and at operation 1525 the group manager 706 returns the randomly generated nonce to the candidate as a challenge.

At operation 1530 the candidate signs the nonce using one of the leaf nodes using signature techniques as described above, and at operation 1535 the candidate returns to group manager 706 the pair comprising the signature of the nonce and the root node of the sub-tree.

At operation 1540 the group manager 706 verifies this signature using the provided root node using verification techniques as described above. If the signature is valid, then at operation 1545 the group manager 706 returns to the candidate the signature of the candidate's root node and the h upper nodes the authentication paths of the sub-tree assigned to the candidate.

After this point, the candidate is a valid group member and can generates signatures (operation 1550) by signing a message using one of the leaf nodes in the sub-tree assigned to the candidate and appending this signature to the signature of his root-node provided by group manager 706. Both revocation mechanisms (signature and key based) can support these new member as defined for any other member.

One skilled in the art will recognize that the various key-generation, signature and verification processes described herein are implemented by simple hash computations. For 128 bits of quantum security, signature generation and verification takes at most hundreds of milliseconds when running on constrained platforms such using 64 byte keys and 2 KB signatures.

Further, the techniques describe herein provide the characteristics of unforgeability, anonymity, and linkability: The unforgeability of the scheme derives from the unforgeability of the employed multi-time signature scheme (e.g., Merkle or XMSS). Further, the techniques described herein are unforgeable even with respect to the group manager, which never learns any group member private-key. The anonymity of the signer is preserved with respect to any group member and to any verifier, as any signature per-se does not lead to the traceability of its issuer and all group members have a same public-key. We note, however, that two signatures from a same group manager are linkable.

Figure 16:
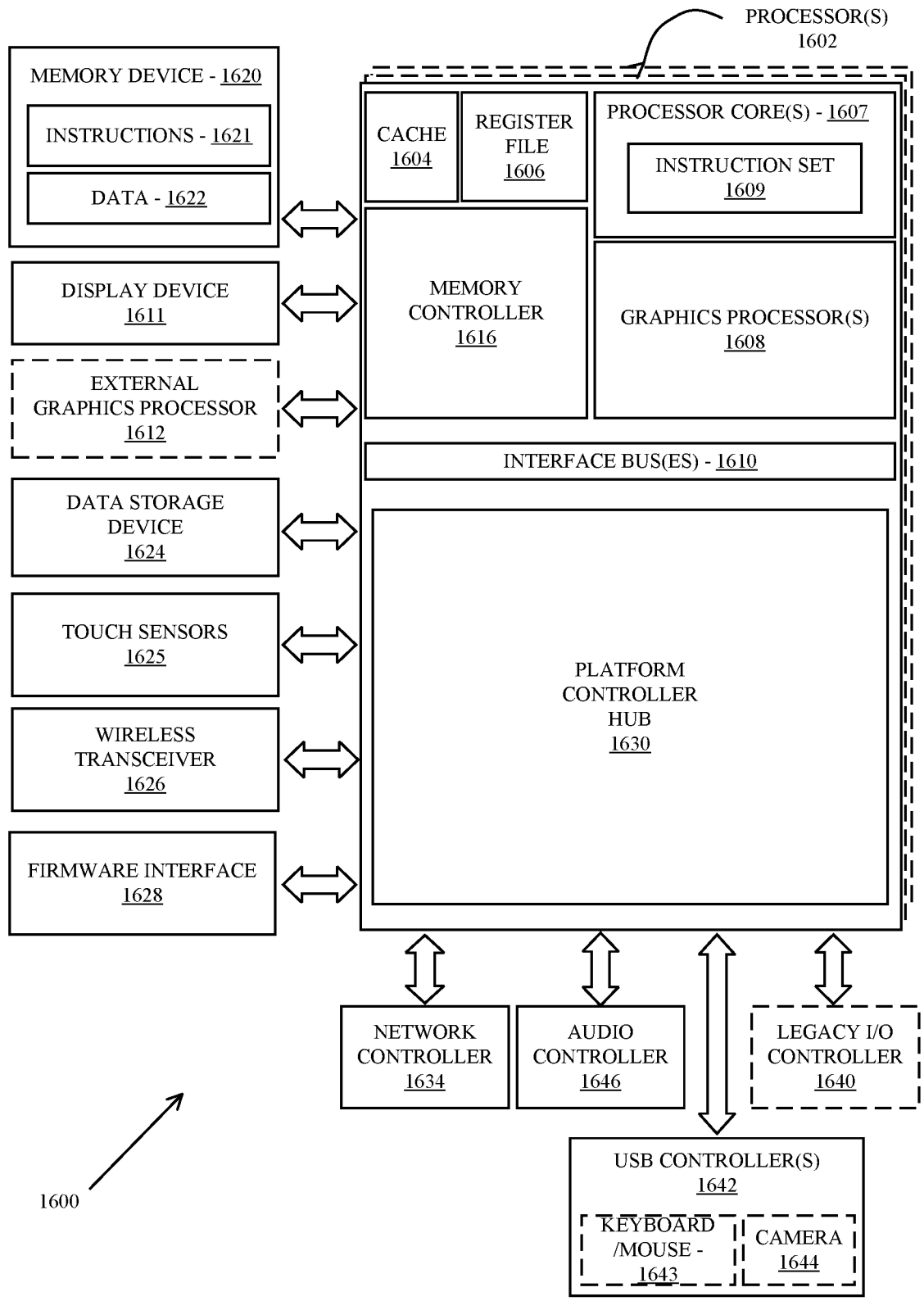
FIG. 16 is a schematic illustration of a computing architecture which may be adapted is a flowchart illustrating operations in a method to implement post-quantum anonymous attestation using a signature-based join protocol, in accordance with some examples.

FIG. 16 illustrates an embodiment of an exemplary computing architecture that may be suitable for implementing various embodiments as previously described. In various embodiments, the computing architecture 1600 may comprise or be implemented as part of an electronic device. In some embodiments, the computing architecture 1600 may be representative, for example of a computer system that implements one or more components of the operating environments described above. In some embodiments, computing architecture 1600 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 includes one or more processors 1602 and one or more graphics processors 1608, and may be a single processor desktop system, a multiprocessor workstation system, or a server system having a large number of processors 1602 or processor cores 1607. In on embodiment, the system 1600 is a processing platform incorporated within a system-on-a-chip (SoC or SOC) integrated circuit for use in mobile, handheld, or embedded devices.

An embodiment of system 1600 can include, or be incorporated within a server-based gaming platform, a game console, including a game and media console, a mobile gaming console, a handheld game console, or an online game console. In some embodiments system 1600 is a mobile phone, smart phone, tablet computing device or mobile Internet device. Data processing system 1600 can also include, couple with, or be integrated within a wearable device, such as a smart watch wearable device, smart eyewear device, augmented reality device, or virtual reality device. In some embodiments, data processing system 1600 is a television or set top box device having one or more processors 1602 and a graphical interface generated by one or more graphics processors 1608.

In some embodiments, the one or more processors 1602 each include one or more processor cores 1607 to process instructions which, when executed, perform operations for system and user software. In some embodiments, each of the one or more processor cores 1607 is configured to process a specific instruction set 1609. In some embodiments, instruction set 1609 may facilitate Complex Instruction Set Computing (CISC), Reduced Instruction Set Computing (RISC), or computing via a Very Long Instruction Word (VLIW). Multiple processor cores 1607 may each process a different instruction set 1609, which may include instructions to facilitate the emulation of other instruction sets. Processor core 1607 may also include other processing devices, such a Digital Signal Processor (DSP).

In some embodiments, the processor 1602 includes cache memory 1604. Depending on the architecture, the processor 1602 can have a single internal cache or multiple levels of internal cache. In some embodiments, the cache memory is shared among various components of the processor 1602. In some embodiments, the processor 1602 also uses an external cache (e.g., a Level-3 (L3) cache or Last Level Cache (LLC)) (not shown), which may be shared among processor cores 1607 using known cache coherency techniques. A register file 1606 is additionally included in processor 1602 which may include different types of registers for storing different types of data (e.g., integer registers, floating point registers, status registers, and an instruction pointer register). Some registers may be general-purpose registers, while other registers may be specific to the design of the processor 1602.

In some embodiments, one or more processor(s) 1602 are coupled with one or more interface bus(es) 1610 to transmit communication signals such as address, data, or control signals between processor 1602 and other components in the system. The interface bus 1610, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1602 include an integrated memory controller 1616 and a platform controller hub 1630. The memory controller 1616 facilitates communication between a memory device and other components of the system 1600, while the platform controller hub (PCH) 1630 provides connections to I/O devices via a local I/O bus.

Memory device 1620 can be a dynamic random-access memory (DRAM) device, a static random-access memory (SRAM) device, flash memory device, phase-change memory device, or some other memory device having suitable performance to serve as process memory. In one embodiment the memory device 1620 can operate as system memory for the system 1600, to store data 1622 and instructions 1621 for use when the one or more processors 1602 executes an application or process. Memory controller hub 1616 also couples with an optional external graphics processor 1612, which may communicate with the one or more graphics processors 1608 in processors 1602 to perform graphics and media operations. In some embodiments a display device 1611 can connect to the processor(s) 1602. The display device 1611 can be one or more of an internal display device, as in a mobile electronic device or a laptop device or an external display device attached via a display interface (e.g., DisplayPort, etc.). In one embodiment the display device 1611 can be a head mounted display (HMD) such as a stereoscopic display device for use in virtual reality (VR) applications or augmented reality (AR) applications.

In some embodiments the platform controller hub 1630 enables peripherals to connect to memory device 1620 and processor 1602 via a high-speed I/O bus. The I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). The data storage device 1624 can connect via a storage interface (e.g., SATA) or via a peripheral bus, such as a Peripheral Component Interconnect bus (e.g., PCI, PCI Express). The touch sensors 1625 can include touch screen sensors, pressure sensors, or fingerprint sensors. The wireless transceiver 1626 can be a Wi-Fi transceiver, a Bluetooth transceiver, or a mobile network transceiver such as a 3G, 4G, or Long Term Evolution (LTE) transceiver. The firmware interface 1628 enables communication with system firmware, and can be, for example, a unified extensible firmware interface (UEFI). The network controller 1634 can enable a network connection to a wired network. In some embodiments, a high-performance network controller (not shown) couples with the interface bus 1610. The audio controller 1646, in one embodiment, is a multi-channel high definition audio controller. In one embodiment the system 1600 includes an optional legacy I/O controller 1640 for coupling legacy (e.g., Personal System 2 (PS/2)) devices to the system. The platform controller hub 1630 can also connect to one or more Universal Serial Bus (USB) controllers 1642 connect input devices, such as keyboard and mouse 1643 combinations, a camera 1644, or other USB input devices.

The following pertains to further examples.

Example 1 is an apparatus, comprising a computer readable memory; a signature module to generate a set of cryptographic keys for attestation of group member devices and a set of leaf nodes in a sub-tree of a Merkle tree corresponding to the set of cryptographic keys; forward the set of leaf nodes to a group manager device; receive, from the group manager device, a subset of intermediate nodes in the Merkle tree, the intermediate nodes being common to all available authentications paths through the Merkel tree for signatures originating in the sub-tree; and determine a cryptographic key that defines an authentication path through the Merkle tree, the authentication path comprising one or more nodes from the set of leaf nodes and one or more nodes from the intermediate nodes received from the group manager device.

In Example 2, the subject matter of Example 1 can optionally include, the signature module to generate a signature of a message using a one-time private key and the at least one authentication path through the Merkle tree.

In Example 3, the subject matter of any one of Examples 1-2 can optionally include the signature module to determine the signature using a set of cryptographic keys that defines the authentication path through the Merkle tree.

In Example 4, the subject matter of any one of Examples 1-4 can optionally include wherein to generate the set of cryptographic keys comprises to determine a number of cryptographic keys to generate based at least in part on a number of leaf nodes assigned to each member compute device of the group in a Merkle-based signature scheme.

In Example 5, the subject matter of any one of Examples 1-4 can optionally include, further comprising a cryptographic module to generate a cryptographic hash of each of one or more of the cryptographic keys of the set of cryptographic keys.

In Example 6, the subject matter of any one of Examples 1-2 can optionally include wherein to generate the set of cryptographic keys comprises to generate one or more asymmetric key pairs, wherein each asymmetric key pair includes a public cryptographic key and a corresponding private cryptographic key.

In Example 7, the subject matter of any one of Examples 1-6 can optionally include wherein to generate the cryptographic hash of each of the one or more cryptographic keys comprises to generate a cryptographic hash of the public cryptographic key of each asymmetric key pair.

Example 8 is a computer-implemented method, comprising generating a set of cryptographic keys for attestation of group member devices and a set of leaf nodes in a sub-tree of a Merkle tree corresponding to the set of cryptographic keys; forwarding the set of leaf nodes to a group manager device; receiving, from the group manager device, a subset of intermediate nodes in the Merkle tree, the intermediate nodes being common to all available authentications paths through the Merkel tree for signatures originating in the sub-tree; and determining a cryptographic key that defines an authentication path through the Merkle tree, the authentication path comprising one or more nodes from the set of leaf nodes and one or more nodes from the intermediate nodes received from the group manager device.

In Example 9, the subject matter of Example 8 can optionally include generating a signature of a message using a one-time private key and the at least one authentication path through the Merkle tree.

In Example 10, the subject matter of any one of Examples 8-9 can optionally include determining the signature using a set of cryptographic keys that defines the authentication path through the Merkle tree.

In Example 11, the subject matter of any one of Examples 68-10 can optionally include generating the set of cryptographic keys comprises to determine a number of cryptographic keys to generate based at least in part on a number of leaf nodes assigned to each member compute device of the group in a Merkle-based signature scheme.

In Example 12, the subject matter of any one of Examples 8-11 can optionally include generating a cryptographic hash of each of one or more of the cryptographic keys of the set of cryptographic keys components to determine a root node value of the Merkle tree.

In Example 13, the subject matter of any one of Examples 8-12 can optionally include generating one or more asymmetric key pairs, wherein each asymmetric key pair includes a public cryptographic key and a corresponding private cryptographic key.

In Example 14, the subject matter of any one of Examples 8-139 can optionally include generating a cryptographic hash of the public cryptographic key of each asymmetric key pair.

Example 15 is a non-transitory computer-readable medium comprising instructions which, when executed by a processor, configure the processor to perform operations, comprising storing a public key associated with a signing device in a computer-readable medium; generating a set of cryptographic keys for attestation of group member devices and a set of leaf nodes in a sub-tree of a Merkle tree corresponding to the set of cryptographic keys; forwarding the set of leaf nodes to a group manager device; receiving, from the group manager device, a subset of intermediate nodes in the Merkle tree, the intermediate nodes being common to all available authentications paths through the Merkel tree for signatures originating in the sub-tree; and determining a cryptographic key that defines an authentication path through the Merkle tree, the authentication path comprising one or more nodes from the set of leaf nodes and one or more nodes from the intermediate nodes received from the group manager device.

In Example 16, the subject matter of Example 15 can optionally include logic, instructions which, when executed by the processor, configure the processor to perform operations, comprising generating a signature of a message using a one-time private key and the at least one authentication path through the Merkle tree.

In Example 17, the subject matter of any one of Examples 15-16 can optionally include instructions which, when executed by the processor, configure the processor to perform operations, comprising determining the signature using a set of cryptographic keys that defines the authentication path through the Merkle tree.

In Example 18, the subject matter of any one of Examples 15-17 can optionally include, wherein generating the set of cryptographic keys comprises determining a number of cryptographic keys to generate based at least in part on a number of leaf nodes assigned to each member compute device of the group in a Merkle-based signature scheme.

In Example 19 the subject matter of any one of Examples 15-18 can optionally include instructions which, when executed by the processor, configure the processor to perform operations, comprising generating a cryptographic hash of each of one or more of the cryptographic keys of the set of cryptographic keys.

In Example 20, the subject matter of any one of Examples 15-19 can optionally include instructions which, when executed by the processor, configure the processor to perform operations, comprising generating one or more asymmetric key pairs, wherein each asymmetric key pair includes a public cryptographic key and a corresponding private cryptographic key.

In Example 21, the subject matter of any one of Examples 15-20 can optionally include instructions which, when executed by the processor, configure the processor to perform operations, comprising generating a cryptographic hash of the public cryptographic key of each asymmetric key pair.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a computer readable memory;
a signature module to:
generate, in a group member device of a set of group member devices, a set of cryptographic keys for attestation of the group member device in the set of group member devices and a set of leaf nodes in a sub-tree of a Merkle tree corresponding to the set of cryptographic keys;
forward, from the group member device to a group manager, a join request message;
receive, from the group manager, a challenge generated from a nonce;
sign the nonce using one of the leaf nodes in the set of leaf nodes;
forward the set of leaf nodes from the group member device to the group manager device;
receive in the group member device, from the group manager device, a subset of intermediate nodes in the Merkle tree, the intermediate nodes being common to all available authentications paths through the Merkel tree for signatures originating in the sub-tree; and
determine, in the group member device, a cryptographic key that defines an authentication path through the Merkle tree, the authentication path comprising one or more nodes from the set of leaf nodes and one or more nodes from the intermediate nodes received from the group manager device.

2. The apparatus of claim 1, the signature module to:
generate a signature of a message using a one-time private key and the at least one authentication path through the Merkle tree.

3. The apparatus of claim 2, the signature module to:
determine the signature using a set of cryptographic keys that defines the authentication path through the Merkle tree.

4. The apparatus of claim 3, wherein to generate the set of cryptographic keys comprises to determine a number of cryptographic keys to generate based at least in part on a number of leaf nodes assigned to each member compute device of the group in a Merkle-based signature scheme.

5. The apparatus of claim 1, further comprising a cryptographic module to generate a cryptographic hash of each of one or more of the cryptographic keys of the set of cryptographic keys.

6. The apparatus of claim 5, wherein to generate the set of cryptographic keys comprises to generate one or more asymmetric key pairs, wherein each asymmetric key pair includes a public cryptographic key and a corresponding private cryptographic key.

7. The apparatus of claim 5, wherein to generate the cryptographic hash of each of the one or more cryptographic keys comprises to generate a cryptographic hash of a public cryptographic key of each asymmetric key pair.

8. A computer-implemented method, comprising:
generating, in a group member device of a set of group member devices, a set of cryptographic keys for attestation of the group member device in the set of group member devices and a set of leaf nodes in a sub-tree of a Merkle tree corresponding to the set of cryptographic keys;
forwarding, from the group member device to a group manager, a join request message;
receiving, from the group manager, a challenge generated from a nonce;
signing the nonce using one of the leaf nodes in the set of leaf nodes;
forwarding the set of leaf nodes from the group member device to the group manager device;
receiving in the group member device, from the group manager device, a subset of intermediate nodes in the Merkle tree, the intermediate nodes being common to all available authentications paths through the Merkel tree for signatures originating in the sub-tree; and
determining, in the group member device, a cryptographic key that defines an authentication path through the Merkle tree, the authentication path comprising one or more nodes from the set of leaf nodes and one or more nodes from the intermediate nodes received from the group manager device.

9. The method of claim 8, further comprising:
generating a signature of a message using a one-time private key and the at least one authentication path through the Merkle tree.

10. The method of claim 9, further comprising:
determining the signature using a set of cryptographic keys that defines the authentication path through the Merkle tree.

11. The method of claim 10, wherein generating the set of cryptographic keys comprises to determine a number of cryptographic keys to generate based at least in part on a number of leaf nodes assigned to each member compute device of the group in a Merkle-based signature scheme.

12. The method of claim 11, further comprising generating a cryptographic hash of each of one or more of the cryptographic keys of the set of cryptographic keys components to determine a root node value of the Merkle tree.

13. The method of claim 12, wherein generating the set of cryptographic keys comprises generating one or more asymmetric key pairs, wherein each asymmetric key pair includes a public cryptographic key and a corresponding private cryptographic key.

14. The method of claim 12, wherein generating the cryptographic hash of each of the one or more cryptographic keys comprises generating a cryptographic hash of a public cryptographic key of each asymmetric key pair.

15. A non-transitory computer storage readable medium comprising instructions which, when executed by a processor, configure the processor to perform operations, comprising:
- storing a public key associated with a signing device in a computer-readable medium;
- generating a set of cryptographic keys for attestation of group member devices and a set of leaf generating, in a group member device of a set of group member devices, a set of cryptographic keys for attestation of the group member device in the set of group member devices and a set of leaf nodes in a sub-tree of a Merkle tree corresponding to the set of cryptographic keys;
- forwarding, from the group member device to a group manager, a join request message;
- receiving, from the group manager, a challenge generated from a nonce;
- signing the nonce using one of the leaf nodes in the set of leaf nodes;
- forwarding the set of leaf nodes from the group member device to the group manager device;
- receiving in the group member device, from the group manager device, a subset of intermediate nodes in the Merkle tree, the intermediate nodes being common to all available authentications paths through the Merkel tree for signatures originating in the sub-tree; and
- determining, in the group member device, a cryptographic key that defines an authentication path through the Merkle tree, the authentication path comprising one or more nodes from the set of leaf nodes and one or more nodes from the intermediate nodes received from the group manager device.

16. The non-transitory computer storage readable medium of claim 15, further comprising instructions which, when executed by the processor, configure the processor to perform operations, comprising:
- generating a signature of a message using a one-time private key and the at least one authentication path through the Merkle tree.

17. The non-transitory computer storage readable medium of claim 16, further comprising instructions which, when executed by the processor, configure the processor to perform operations, comprising:
- determining the signature using a set of cryptographic keys that defines the authentication path through the Merkle tree.

18. The non-transitory computer storage readable medium of claim 17, wherein generating the set of cryptographic keys comprises determining a number of cryptographic keys to generate based at least in part on a number of leaf nodes assigned to each member compute device of the group in a Merkle-based signature scheme.

19. The non-transitory computer storage readable medium of claim 18, further comprising instructions which, when executed by the processor, configure the processor to perform operations, comprising:
- generating a cryptographic hash of each of one or more of the cryptographic keys of the set of cryptographic keys.

20. The non-transitory computer storage readable medium of claim 19, further comprising instructions which, when executed by the processor, configure the processor to perform operations, comprising:
- generating one or more asymmetric key pairs, wherein each asymmetric key pair includes a public cryptographic key and a corresponding private cryptographic key.

21. The non-transitory computer storage readable medium of claim 19, further comprising instructions which, when executed by the processor, configure the processor to perform operations, comprising:
- generating a cryptographic hash of the public cryptographic key of each asymmetric key pair.

* * * * *